United States Patent [19]
Albrecht et al.

[11] Patent Number: 5,157,251
[45] Date of Patent: Oct. 20, 1992

[54] SCANNING FORCE MICROSCOPE HAVING ALIGNING AND ADJUSTING MEANS

[75] Inventors: Thomas R. Albrecht, San Jose; Moris-Musa Dovek, Portola Valley; Michael D. Kirk, San Jose; Sang-IL Park, Palo Alto, all of Calif.

[73] Assignee: Park Scientific Instruments, Sunnyvale, Calif.

[21] Appl. No.: 668,886

[22] Filed: Mar. 13, 1991

[51] Int. Cl.⁵ .............................................. H01J 40/14
[52] U.S. Cl. .................................... 250/216; 250/307
[58] Field of Search ............... 250/216, 230, 234, 561, 250/306, 307

[56] References Cited
U.S. PATENT DOCUMENTS 4,935,634  6/1990  Hansma et al. ..................... 250/560
4,999,494  3/1991  Elings ................................. 250/307

Primary Examiner—David C. Nelms
Assistant Examiner—T. Davenport
Attorney, Agent, or Firm—Flehr, Hohbach, Test, Albritton & Herbert

[57] ABSTRACT

A scanning force microscope having a sensor head and a base wherein a moveable sample holder is housed in the base and is positioned relative to a probe housed in the sensor head, such sample being monitored by an optical deflection detection system. The detection system is configured to provide direct visual observation of the probe with respect to the sample. The mirror of the detection system is mounted in a cut away portion of a sphere and defines the axis of rotation of a kinematic mount, such providing ease of fine adjustment of the detection system. The sensor head is in communication with the base by a stage kinematic mount, such providing ease of position adjustment of the sensor head with respect to the base.

33 Claims, 6 Drawing Sheets

SCANNING FORCE MICROSCOPE HAVING ALIGNING AND ADJUSTING MEANS

BRIEF DESCRIPTION OF THE INVENTION

This invention relates generally to scanning microscopes used to examine such samples as thin-film depositions and semiconductor defects. More particularly, it relates to scanning force microprobes of the type having a probe positioned relative to a sample holder and orientation devices for the same. Most particularly this invention describes a scanning force microscope that has an open architecture for an unobstructed view of the sample, an easy to use and intuitive alignment mechanism of the detection system and means of locating the probe to a desired region of the sample.

BACKGROUND OF THE INVENTION

The scanning force microscope is one example in a broad category of scanning microprobes. Types of microprobes described to date are sensitive, inter alia, to magnetic, electrical, mechanical, geometrical, thermal, electrostatic and optical properties of the sample. In general terms, a scanning microprobe is an instrument that maps a spatially varying surface property into an image. In the scanning force microscope, as the sample moves in the horizontal plane relative to the probe, the probe which is mounted on a flexible cantilever is deflected due to the forces between the probe and the sample's surface. For the case of topographic imaging in the repulsive mode, the tip of the cantilever is scanned across the surface of the sample, the cantilever's deflection increases for peaks and decreases for valleys. The deflection of the cantilever is monitored with an optical deflection detection system. In this scheme, a laser beam from a laser diode is reflected off the top of the cantilever onto a position sensitive photodiode. A given cantilever deflection will correspond to a specific position of the laser beam on the photodiode. A servo loop, using the position detected, sends a correction signal to a transducer element which is connected to the sample holder to adjust the spacing between the sample and the probe in order to maintain constant force between probe and sample. This correction signal is recorded as the Z height of each point on the sample.

Most scanning force microscopes are connected to computer systems that create gray-scale images to represent the height information of a sample's surface. In a gray-scale image, x and y data form the horizontal plane and z data is displayed in a linear scale in which the brightness of the data point is directly correlated with the height of the surface structure. A darker data point corresponds to a lower height value, while a brighter data point corresponds to a higher height value.

Another possible computer-based topographic representation is three-dimensional image rendering of surfaces. In this representation, height is shown by superimposing the gray scale on a third (perpendicular) axis and rotating the display to an informative viewing angle. One can add a computer-generated artificial light source to cast shadows that enhance the three-dimensional rendition.

An optical deflection detection system used in the prior art includes a laser positioned directly above the cantilever, so that the laser's light directly impinges the cantilever. This is described in U.S. Pat. No. 4,935,634. The cantilever is positioned at an angle relative to the horizontal plane so that the path of the beam reflected off the cantilever is at an angle different than the incident beam. The reflected beam is then reflected off a fixed mirror so that the light strikes a detection device.

There are several disadvantages to the configuration of the prior art. Because the laser is positioned directly above the cantilever, the line of sight to the probe and the sample is obstructed so that any visual observation of the sample position relative to the probe can only be performed at an oblique angle or by disassembling the apparatus. Adjustment of the probe position can therefore be a very time consuming and awkward process. Furthermore, the adjustment accuracy is degraded by the off-axis view, particularly since the depth of field limits viewing to a narrow region.

Generally, the optical deflection detection device requires very precise positioning because the spot on the cantilever that must be hit by the laser beam is typically only 10 microns in diameter and the size of the laser diode beam is about 7 microns. Therefore, fine control of the angular positioning of the beam with respect to the cantilever and the photodetector is desirable. The mirror of the prior art, however, is fixed and therefore the detection system is difficult to adjust. Adjustment is by lateral positioning of the laser beam which may compromise mechanical stability.

Another disadvantage of the prior art is the complexity and inaccuracy of arrangements to adjust the position of the probe relative to the sample. Because of the strict requirements for mechanical stability, it is typical to employ a kinematic mount to couple the scanner and sample assembly to the probe and sensor head. Such arrangements require separate translation arrangements to permit probe positioning on the sample and typically these reduce the mechanical rigidity of the apparatus.

OBJECTS OF THE INVENTION

In light of the aforementioned problems with the prior art, it is therefore an object of the present invention to provide a scanning microscope in which is there are minimal physical obstructions to visual observational adjustments of the probe with respect to the sample.

It is another object of the present invention to provide a scanning microprobe in which there are minimal physical obstructions to visual observational adjustments of the laser with respect to the probe.

It is also an object of the present invention to provide a high stability optical deflection detection system having fine adjustment capabilities in approximately orthogonal axes making it easy to use.

Furthermore, it is also an object of the present invention to provide a scanning microscope having adjustment capabilities with two degrees of freedom, that is, independent axes of motion of the probe relative to the sample.

SUMMARY OF THE INVENTION

The scanning force microscope of the present invention includes a sensor head which houses the probe and the optical deflection detection system and a base which houses the sample holder. The probe is mounted on the underside of a flexible cantilever and a reflector is mounted on the top of the flexible cantilever or the reflector may be of material which is coated on to the flexible cantilever or it may be that the cantilever itself is reflective, such being affixed to a tip holder rigidly mounted within the sensor head. The optical deflection detection system is movably mounted within the sensor head.

The optical deflection detection system includes a laser diode which emits light that is reflected off a mirror and directed to the reflector. The reflector in turn reflects the light to a detector, such being a split detector. Feedback information regarding the position of the probe, that is whether the cantilever has been deflected, is sent to the control system of a servo loop which adjusts the position of the sample holder. The feedback arrangement described herein may be optional wherein the probe may actually provide the map of the sample, eliminating the need for a feedback arrangement.

The optical deflection detection system is arranged so that there are no physical obstructions to viewing the probe from vertically above the probe and the sample. The laser is positioned above and to one side of the probe so that the probe is visible when viewed from above. It should be noted that the language of above, below and to one side used in the specification including the claims is meant in a relative sense, and is not intended to impart any limitations to the three dimensional orientation which the present invention may be used.

The mirror of the deflection detection system is adjustable for fine control of the angular positioning of the beam with respect to the cantilever and the photodetector. To this end, the mirror is mounted in a kinematic mount, for example, in the cut-away portion of a sphere of a kinematic mount, such sphere meeting a conical contact zone within the sensor head. Any shaped piece can be used in place of a sphere. Furthermore, the mount has two arms, orthogonal to one another, one having a groove contact zone, the other having a plane contact zone. The sphere defines the mount's axis of rotation, further with the mirror mounted at or near the center of the sphere then the steering of the mirror by some adjustment means results in purely angular motion of the laser beam at the cantilever depending on which arm is adjusted. Therefore, since the mirror is mounted at or near the center of a sphere and there are at least two means of adjustment of the orientation of the sphere, then the result is nearly independent motion of the laser beam. This makes alignment of the laser easy and intuitive. The kinematic mount is positioned within the sensor head, such having translational knobs for meeting the groove contact zone and the plane contact zone and for adjustment of the position of the mirror kinematic mount.

The sensor head also includes a stage kinematic mount which provides for the adjustment of the entire sensor head with respect to the base of the scanning force microscope. It too includes a groove contact zone, a plane contact zone and a conical contact zone, such being adjustable in two approximately orthogonal directions in the horizontal plane. Incorporated into the base are adjustable approach screws with spherical tips for meeting the contact zones of the stage kinematic mount.

Other objects and advantages of the invention will become apparent upon reading the following detailed description with reference to the drawings.

DETAILED DESCRIPTION OF THE PREFERRED EMBODIMENT

Figure 1:
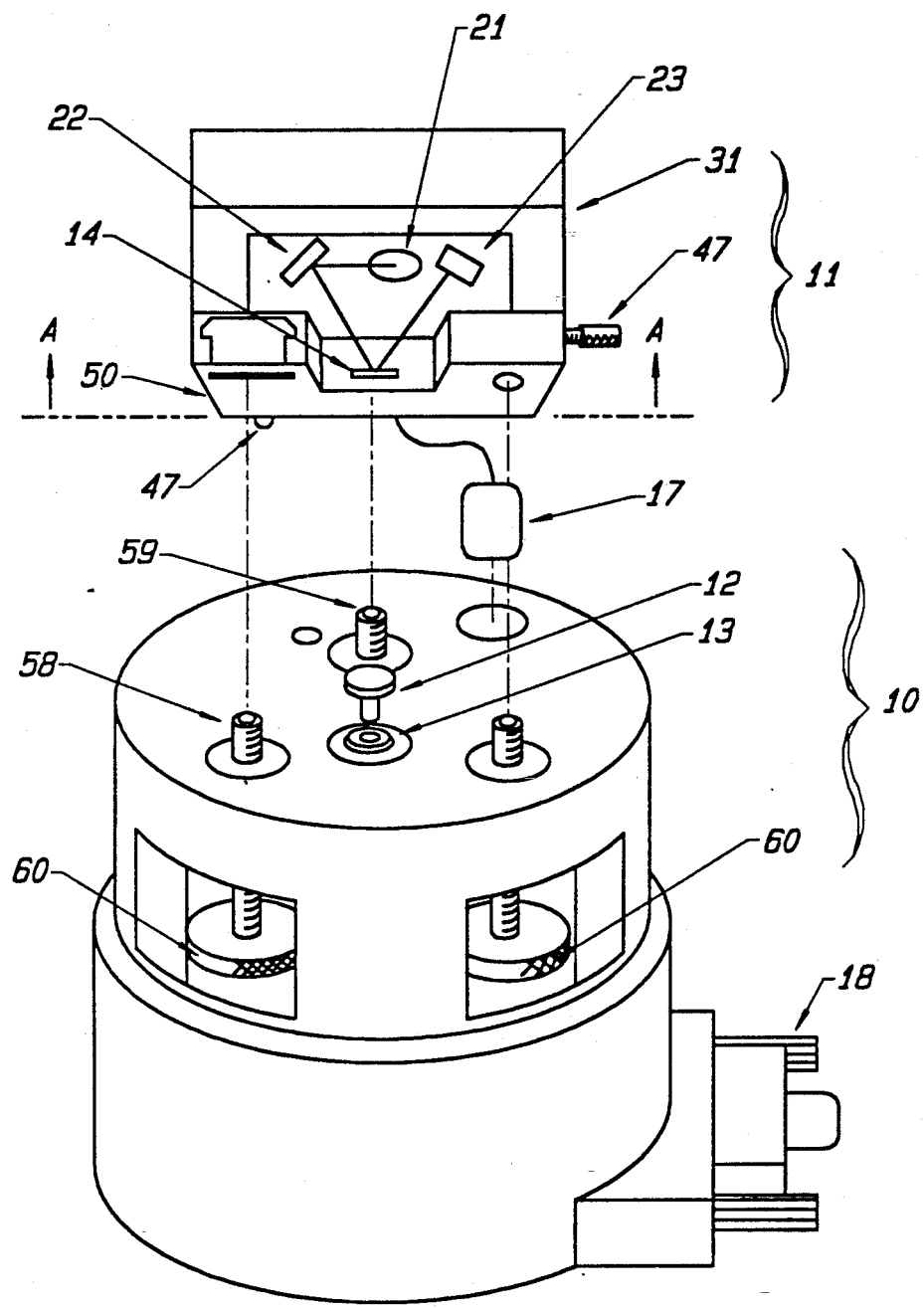
FIG. 1 is an exploded view show a scanning force microscope in accordance with the preferred embodiment.

The scanning force microscope of the present invention as shown in FIG. 1, has a base portion 10 and a sensor head portion 11. Typically, base portion 10 houses the sample on sample holder 12 mounted on sample piezoelectric scanner 13. As stated above, the sample is mounted for movement relative to the probe 14. The probe 14 is mounted so that it is generally positioned opposite the sample on a flexible cantilever 16, the continuation of which is deflected according to the surface height of the sample (see FIG. 2). Such means for positioning the sample holder laterally 12 relative to the probe 14 is incorporated into the sensor head 11. The scanning movement of the sample relative to the probe is controlled by a servo loop wherein connector 17 and connector 18 are in communication with the servo loop and the sample piezoelectric scanner 13. Position adjustment signals are sent to the movable sample scanner 13 accordingly.

Figure 2:
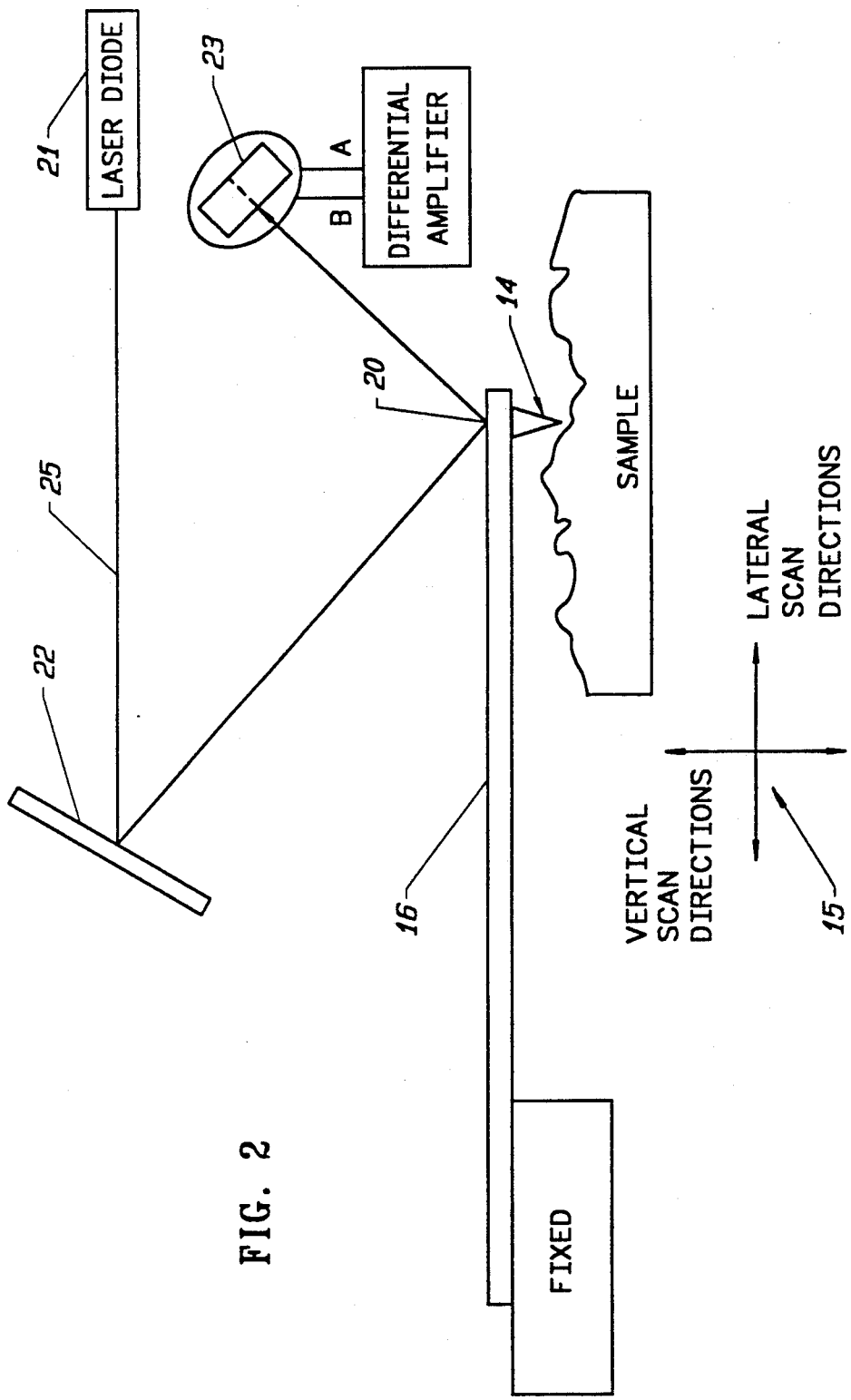
FIG. 2 is a schematic diagram of the deflection detection system of the present invention.

A sample scanner 13 may be a tubular piezoelectric device which has a central electrically continuous portion and an outer portion, divided into electrically isolated quadrants. Viewing such a tubular piezoelectric device from one annular end, the outer portion quadrants are divided according to 90 degree arcs, one piezoelectric element occupying the area of zero degrees to 90 degrees, a second occupying the area of 90 degrees to 180 degrees, and so on. By applying a voltage to the tubular piezoelectric device and thereby changing its shape, the sample is moved. When a voltage is applied to the central portion with respect to the outer quadrants equally, the sample holder 12 effects vertical movement of the sample mounted upon it. When a voltage is applied to the outer portions unequally, lateral and vertical movement of the sample as indicated by reference number 15 of FIG. 2 is effected. Such a sample holder is more thoroughly described by Binnig and Smith in *Review of Scientific Instruments*, August 1986.

FIG. 2 shows a schematic of the deflection detection system which produces information utilized by the servo loop for the continual adjustment of sample holder 12 with respect to the probe 14. A reflector 20, made of a suitable reflecting material, may be positioned upon the end of the cantilever 16. A laser diode 21 is positioned above and to one side of the probe 14 and reflector 20. The light 25 of the laser 21 is first directed to a mirror 22 which in turn reflects the light 25 to reflector 20. The light 25 reflected off of reflector 20 strikes photodetector 23, such being a split detector. Signals proportional to the light sensed by each half of detector 23 are subtracted to form a signal proportional to the deflection angle of reflector 20.

The feedback arrangement of the instant invention utilizes the split photodetector for comparison, wherein a reference voltage is compared to the signals described above. The sample is moved up or down by the sample holder 12 corresponding to the deflection of the cantilever, such movement ultimately providing the map of the sample.

FIG. 2 shows that there are minimal physical obstructions to visual observational adjustments of the probe with respect to the sample. In the preferred embodiment, the top portion of the sensor head has a space 30 (see FIG. 3) which may be covered by a removable member, such space allowing one to look directly down upon the cantilever to adjust its position with respect to the sample and to adjust the laser alignment on the cantilever.

Figure 3:
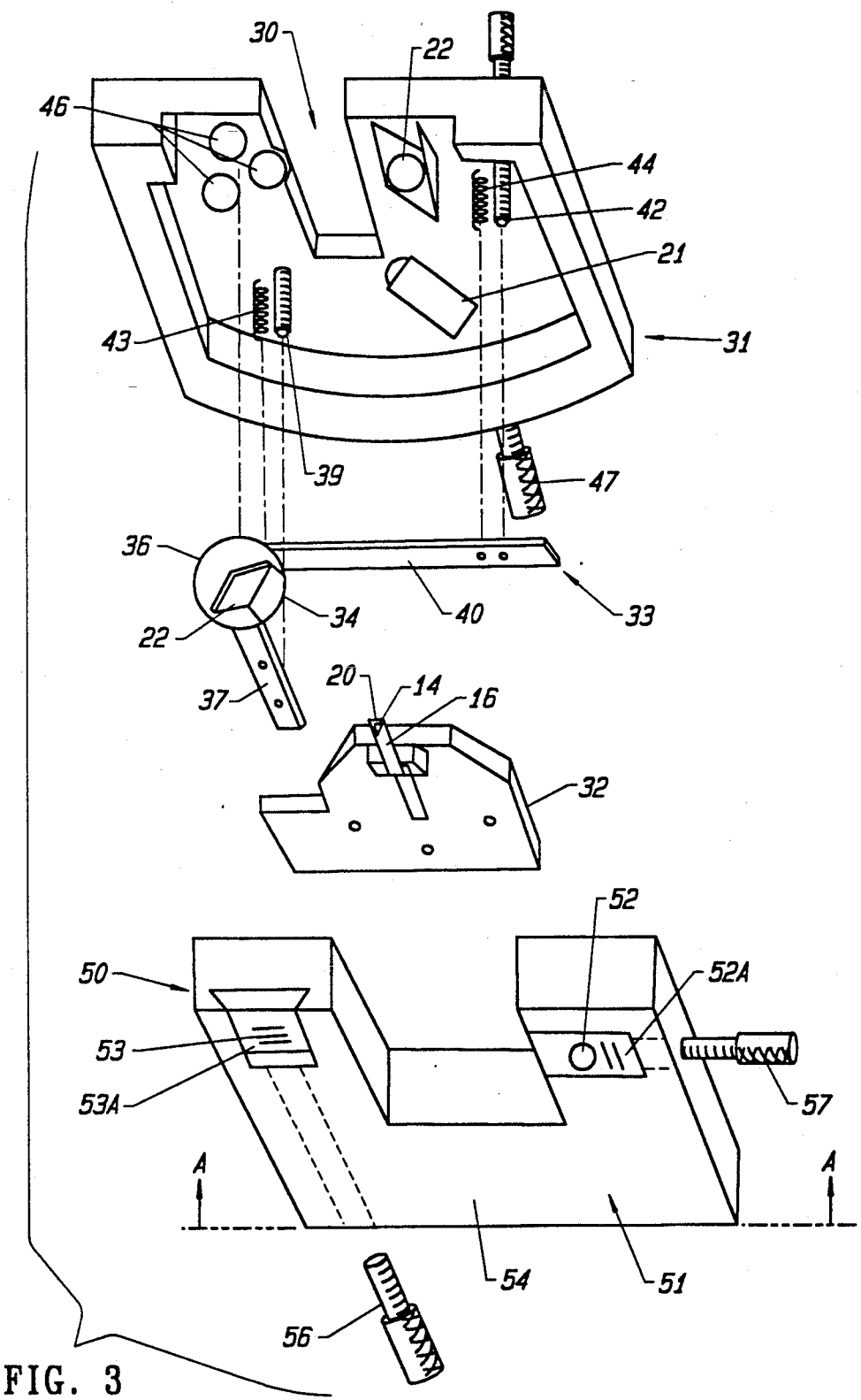
FIG. 3 shows an expanded view a portion of the apparatus of the preferred embodiment.

FIG. 3 shows an expanded view of the sensor head 11 of the preferred embodiment looking up from arrows A of FIG. 1. The optical deflection device and probe of the present invention is housed in the top portion 31 of sensor head 11. The probe mounted on cantilever 16 is in turn mounted on tip holder 32, such being fixably mounted within the top portion 31 of sensor head 11.

Figure 4:
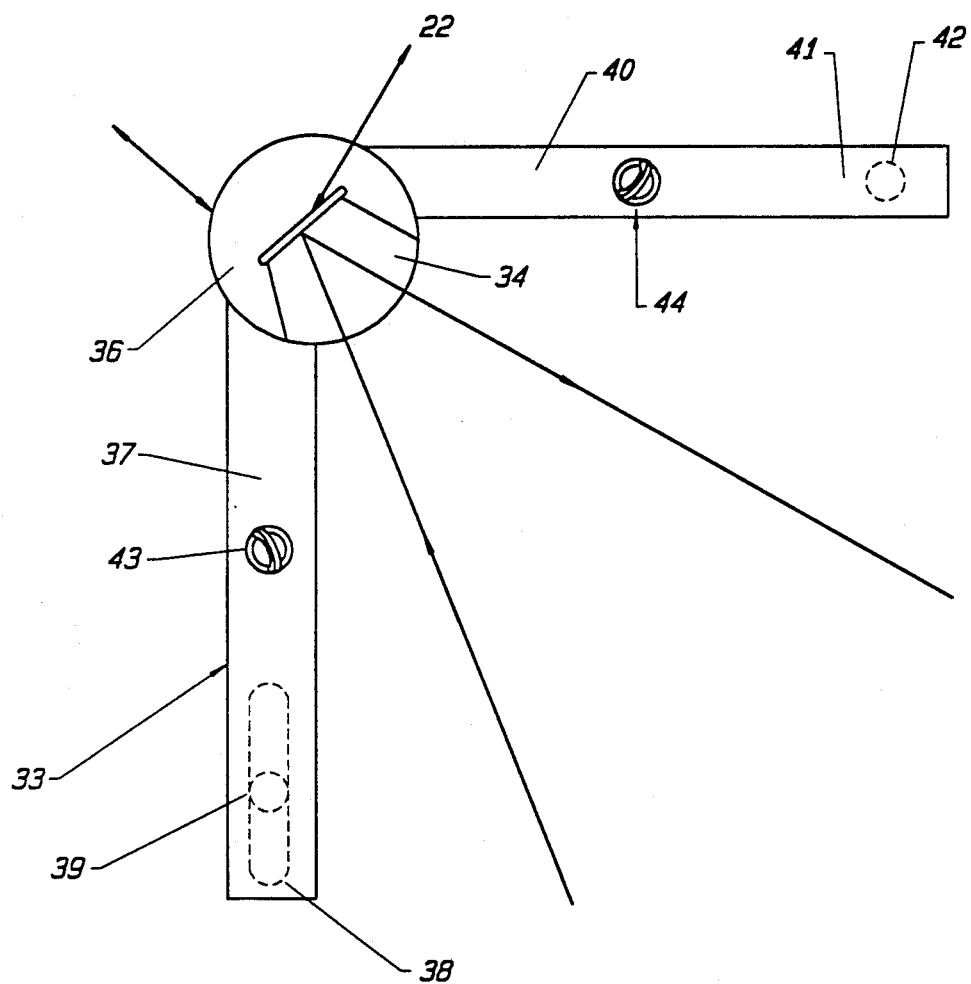
FIG. 4 shows the mirror kinematic mount of the present invention.

The means for aligning the deflection device includes securing the mirror 22 within a cut away portion 34 of sphere 36 of the mirror kinematic mount 33. FIG. 4 shows kinematic features of mirror kinematic mount 33 wherein a first arm 37 has groove contact area 38 which meets ball end screw 39 (see FIG. 3) and a second arm 40 has a flat contact area 41 which meets ball end screw 42. When an adjustment is made to one contact area, the other contact areas also adjust, avoiding tension in the system. However, it can also be envisioned that simple sliding surfaces would suffice if other tension relieving mechanisms were provided. Furthermore, alternative kinematic mounts other than spherical mounts might suffice for sphere 35, for example, flexure mounts.

Figure 5:
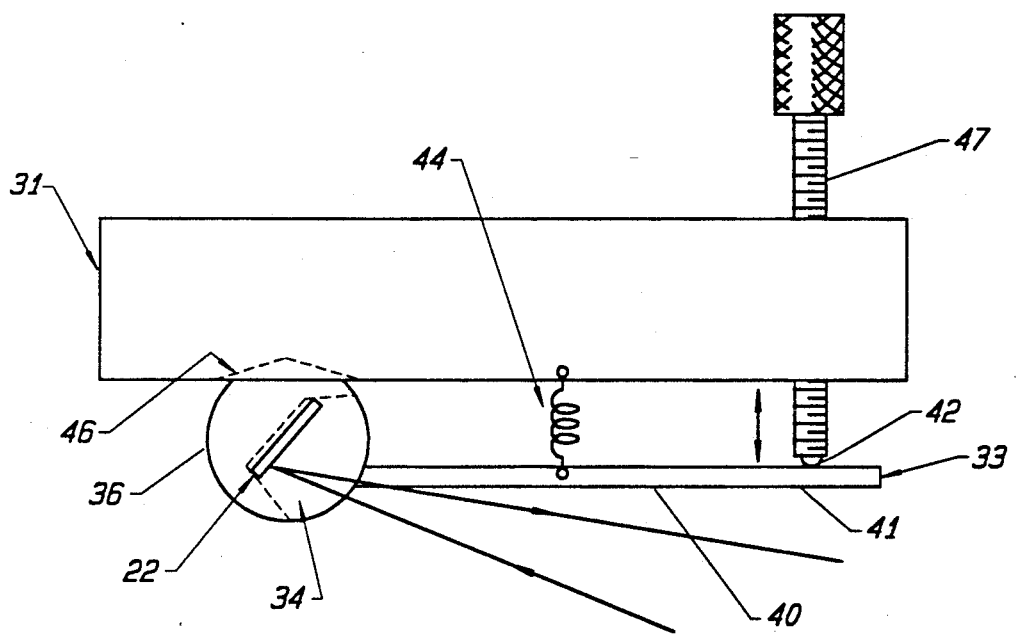
FIG. 5 shows the mirror kinematic mount of the present invention incorporated into the top portion of the apparatus.

As shown in FIG. 5, arm 40 is flexibly secured to the top portion 31 by spring 44. Although not shown, arm 37 is also flexibly secured to the top portion 31 by spring 43. Springs 43 and 44 hold sphere 36 and the rest of mirror mount 33 under positive pressure, keeping the assembly together. Were the assembly mounted upside down, gravity alone would keep the assembly together.

The means for positioning sphere 36 is placing the sphere 36 in contact with three spheres 46 which are arranged in a triangular configuration. Such a configuration provides a conical contact zone for kinematic mounting. The means for adjusting the mirror kinematic mount 33 with respect to the top portion 31 is detector adjustment screw 47 which provides translational motion.

By adjusting the position of adjustment screws 47 up or down, the normal of mirror 22 will rotate about the rotational point of the sphere 39 in which it is mounted when mounted in the center of the sphere the rotation of the normal of the mirror can be performed in an least independent motions with minimal translation of the light. This makes steering the laser beam to the cantilever probe easy and intuitive. Because first arm 37 is orthogonal to second arm 40, the light steered by the mirror 22 will be steered in approximately orthogonal angular directions.

Figure 6:
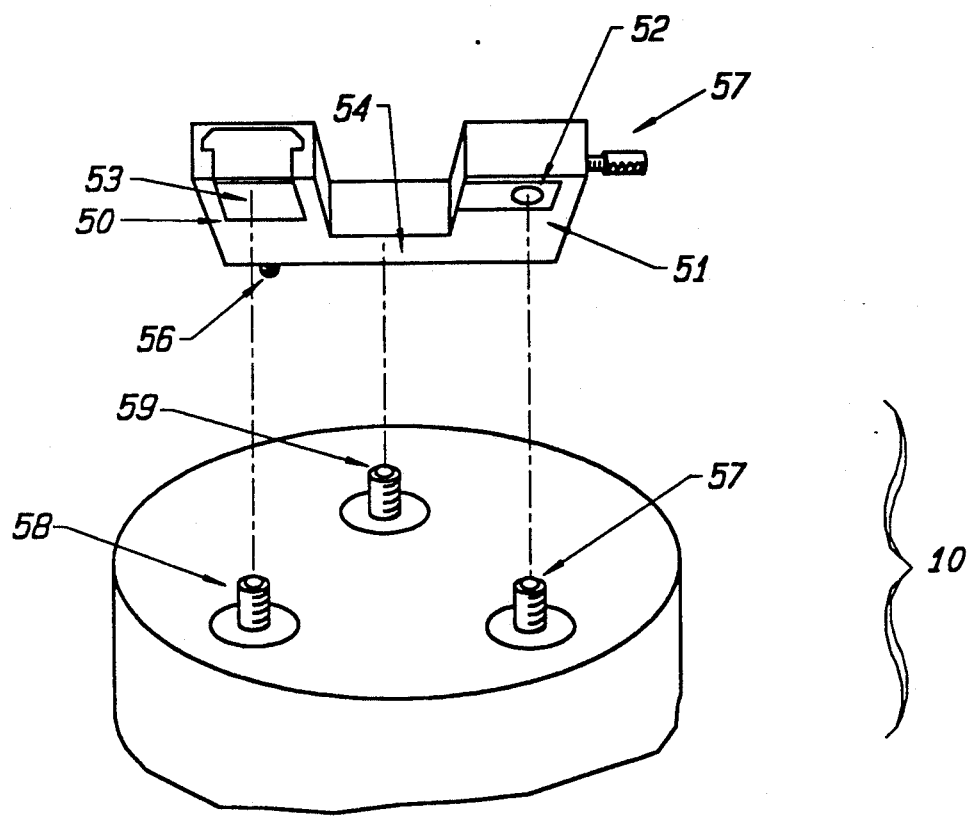
FIG. 6 shows a detailed drawing the stage kinematic mount of the present invention.

A second degree of adjustment freedom of the sensor head 11 with respect the sample is provided by stage kinematic mount 50 having movable contact portions, for effecting translation of the mount. On a surface 51 facing the base 10, the stage mount 50 has a first movable contact portion 52a and conical contact zone 52, a second movable contact portion 53a and groove contact zone 53 and planar contact zone 54 each of which positioned at corners of a triangle superimposed on the surface 51. The position of the contact zones relative to surface 51 is adjustable by translation knobs 56 and 57, wherein knob 56 adjusts the position of slot 50 relative to surface 51 and knob 57 adjusts the position of conical contact zone 52 relative to surface 51. FIG. 6 shows surface 51 facing base 10 such that the course adjustment screws 57, 58, 59 meet conical contact zone 52, groove contact zone 53 and planar contact zone 54, respectively. The height of the course adjustment screws is adjustable by knurled knobs 60.

The stage mount 50 provides translational motion in two approximately orthogonal directions. Therefore, the present invention provides versatility in orientation of the probe relative to the sample as well as versatility in orientation of the detection deflection system by virtue of the systems disclosed herein. Furthermore, the present invention provides ease in visual observational adjustments of the probe with respect to the sample as well as the laser with respect to the probe.

In view of the foregoing, it is clear that the object of the present invention to provide a scanning microscope in which there are no physical obstructions to visual observational adjustments of the probe with respect to the sample as well as the laser with respect to the probe has been achieved. Moreover, the object of the present invention to provide an optical deflection detection system having fine adjustment capabilities has also been achieved by the mirror kinematic mount. Furthermore, the object of providing a scanning microscope having adjustment capabilities with two degrees of freedom has been achieved by including the stage kinematic mount. Finally, the object of providing improved mechanical rigidity to the apparatus has also been achieved.

While the invention has been herein shown and described in what is presently conceived to be the most practical and preferred embodiment of the invention, it will be apparent to those of ordinary skill in the art that many modifications thereof may be made within the scope of the invention, which scope is to be accorded the broadest interpretation of the claims so as to encompass all equivalent structures and devices.

We claim:

1. A scanning probe microscope apparatus having a sample holder for holding a sample positioned relative to a probe, such positioning being monitored by an optical deflection detection system, comprising:
   a sensor head including a top portion for housing said probe and said optical deflection detection system;
   a base portion for housing said sample holder;
   means for steering an optical beam of said deflection detection system along a path;
   means for aligning said optical deflection detection device within said sensor head which allows an unobstructed view of the vicinity of the sample and the probe from a position above the sample and in a direction approximately perpendicular to the plane of lateral scanning of the sample; and
   means for adjustably situating said sensor head relative to said base, such means being independent from said means for aligning said optical deflection detection device within said sensor head.

2. An apparatus as recited in claim 1 wherein said means for aligning said optical deflection detection system comprises a mirror in said deflection detection system's optical beam's path.

3. An apparatus as recited in claim 2 wherein said mirror is situated at approximately the rotational center of a rotatable holder.

4. An apparatus as recited in claim 3 wherein said rotatable holder is a sphere having a cut away portion and wherein said mirror is mounted within said cut away portion.

5. An apparatus as recited in claim 3 wherein said rotatable holder further comprises:
   a first element positioned between said base portion and said top portion comprising:
   a first arm connected to said rotatable holder;
   a second arm connected to said rotatable holder and orthogonal to said first arm; and
   wherein positional adjustment of said first element provides rotation of said rotatable holder which defines rotation of said mirror.

6. An apparatus as recited in claim 5 wherein said first arm has a first zone for kinematic mounting and wherein said second arm has a second zone for kinematic mounting.

7. An apparatus as recited in claim 6 further comprising:
   a second element incorporated into said apparatus top portion comprising:
   first position means for positioning said rotatable holder; and
   adjustment means associated with said first contact zone and said second contact zone for adjusting the position of said first element relative to said second element.

8. An apparatus as recited in claim 7 wherein said first position means for positioning said holder is a conical contact zone.

9. An apparatus as recited in claim 7 wherein said adjustment means comprises at least one adjustment screw.

10. An apparatus as recited in claim 1 wherein means for steering an optical beam of said deflection detection system, comprising:
    a reflective cantilever including a probe;
    a light source which emits light for reflection off said cantilever, said light oblique to said sample holder;
    a mirror in the path of said light, directing said light to said cantilever; and
    a detector for receiving said light which has been reflected off said cantilever.

11. An apparatus as recited in claim 10 wherein said means for positioning said sample holder relative to said probe comprises a feedback arrangement wherein said detector is a light position sensitive detector which provides feedback information regarding deflection of said probe relative to said sample to a control system, such control system involving a servo loop which adjusts the position of said sample holder relative to said sensor head according to said feedback information.

12. An apparatus as recited in claim 1 wherein said means for adjustably situating said sensor head relative to said base comprises a movable stage.

13. An apparatus as recited in claim 12 wherein said movable stage is a stage kinematic mount to said base.

14. An apparatus as recited in claim 13 wherein said stage kinematic mount comprises:
    a third element having a first contact zone, a second contact zone and a third contact zone, each one of said contact zones positioned at one of the corners of a triangle superimposed on said first element, such third element incorporated into said top portion and facing said apparatus base portion; and
    a fourth element having approach screws being associated with at least one of said contact zones, such fourth element being incorporated into said apparatus base portion and facing said top portion.

15. An apparatus as recited in claim 14 further comprising second position adjustment means for adjusting the position of said sensor head relative to said base.

16. An apparatus as recited in claim 15 wherein said second position adjustment means comprises screw means incorporated into said sensor head.

17. A scanning probe microscope apparatus having a sample holder positioned relative to a probe, such positioning being monitored by an optical deflection detection device, comprising:
    (A) a sensor head including a top portion, such sensor head for housing said probe and said optical deflection detection device;
    (B) a base portion for housing said sample holder;
    (C) wherein said optical deflection detection system comprises:
    a reflective cantilever including a probe;
    a light source which emits light for reflection off said cantilever;
    a mirror in the path of said light, directing said light to said cantilever; and
    a detector for receiving said light which has been reflected off said cantilever.

18. An apparatus as recited in claim 17 further comprising means for aligning said optical deflection detection device within said sensor head.

19. An apparatus as recited in claim 17 wherein said means for positioning said sample holder relative to said probe comprises a feedback arrangement wherein said detector is a light position sensitive detector which provides feedback information regarding deflection of said probe relative to said sample to a control system, such control system involving a servo loop which adjusts the position of said sample holder relative to said sensor head according to said feedback information.

20. A scanning probe microscope apparatus having a sample holder positioned relative to a probe, such positioning being monitored by an optical deflection detection device, comprising:
    a sensor head having a top portion, such sensor head for housing said probe and said optical deflection detection device and a base portion for housing said sample holder; and
    means for aligning said optical deflection detection device within said sensor head which allows an unobstructed view of the vicinity of the sample and the probe from a position above the sample and in a direction approximately perpendicular to the plane of lateral scanning of the sample.

21. An apparatus as recited in claim 20 wherein said means for aligning said optical deflection detection system comprises a mirror in said deflection detection system's optical beam's path.

22. An apparatus as recited in claim 21 wherein said mirror is situated at approximately the rotational center of a rotatable holder.

23. An apparatus as recited in claim 22 wherein said rotatable holder is a sphere having a cut away portion and wherein said mirror is mounted within said cut away portion.

24. An apparatus as recited in claim 22 wherein said rotatable holder further comprises:

a first element positioned between said base portion and said top portion comprising:

a first arm connected to said rotatable holder;

a second arm connected to said rotatable holder and orthogonal to said first arm; and wherein positional adjustment of said first element provides rotation of said rotatable holder which defines rotation of said mirror.

25. An apparatus as recited in claim 24 wherein said first arm has a first zone for kinematic mounting and wherein said second arm has a second zone for kinematic mounting.

26. An apparatus as recited in claim 25 further comprising:

a second element incorporated into said apparatus top portion comprising:

position means for positioning said rotatable holder; and adjustment means associated with said first contact zone and said second contact zone for adjusting the position of said first element relative to said second element.

27. An apparatus as recited in claim 26 wherein said position means for positioning said holder is a conical contact zone.

28. An apparatus as recited in claim 26 wherein said adjustment means comprises at least one adjustment screw.

29. A scanning probe microscope apparatus having a sample holder positioned relative to a probe, comprising:

a sensor head for housing said probe;

a base portion for housing said sample holder; and means for adjustably situating said sensor head relative to said base, such means comprising a stage kinematic mount.

30. An apparatus as recited in claim 29 wherein said stage kinematic mount comprises:

a sensor head element incorporated into said sensor head and facing said apparatus base portion, such element having a first contact zone on a moveable first contact portion, a second contact zone on a moveable second contact portion and a third contact zone, each one of said contact zones positioned at one of the corners of a triangle superimposed on said element; and a base element incorporated into said apparatus base portion and facing said sensor head element, such element having approach screws associated with at least one of said contact zones.

31. An apparatus as recited in claim 30 further comprising position adjustment means for adjusting the position at least one of said moveable contact portions relative to said sensor head.

32. An apparatus as recited in claim 31 wherein said position adjustment means comprises screw means incorporated into said sensor head.

33. An apparatus as recited in claim 30 wherein said first contact zone is a slot and said second contact zone is a cone.

* * * * *